United States Patent Office 2,805,237
Patented Sept. 3, 1957

2,805,237

PROCESS FOR PREPARING TRIORGANO(1,4-DICARBOXY-2-BUTYL)SILANES

Alfred D. Kiffer, Kenmore, and William T. Black, Buffalo, N. Y., assignors to Union Carbide Corporation, a corporation of New York No Drawing. Application March 28, 1955, Serial No. 497,415

5 Claims. (Cl. 260—448.2)

This invention relates to a process for preparing triorgano(1,4-dicarboxy-2-butyl)silanes. More particularly, the invention relates to a process for preparing alkyl-, alkylalkoxy- and alkoxy(1,4-dicarboxy-2-butyl)-silanes by a process which includes oxidizing the ozonides of the cyclohex-3-enylalkyl-, cyclohex-3-enylalkylalkoxy- and cyclohex-3-enylalkoxysilanes.

The triorgano(1,4-dicarboxy-2-butyl)silanes which are prepared by the process of the instant invention can be represented graphically by the formula:

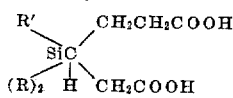

where R and R' represent organic groups such as alkyl groups and alkoxy groups. Examples of the alkyl groups which R and R' may represent include methyl, ethyl, propyl and the like groups, while examples of the alkoxy groups which R and R' may represent include methoxy, ethoxy, propoxy and the like groups. The organic groups represented by R and R' need not necessarily be like groups, that is R and R' may represent different alkyl groups, different alkoxy groups, or one may represent an alkyl group while the other may represent an alkoxy group.

In accordance with our invention, triorgano(1,4-dicarboxy-2-butyl)silanes are prepared by first reacting a cyclohex-3-enyltriorganosilane with ozone to form an ozonide. The resulting ozonide is then oxidized with the formation of the dicarboxylic acid. The overall reaction may be depicted by the following equation:

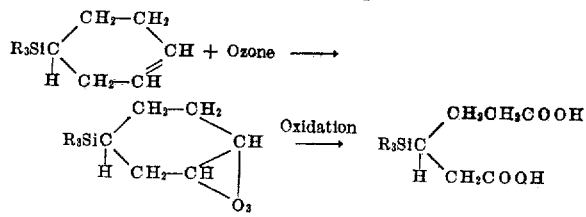

where R represents an organic radical as shown above.

The process can be carried out by introducing ozone into a solution of a cyclohex-3-enyltriorganosilane to form the corresponding ozonide and then introducing an oxidizing compound into a solution of the ozonide to form a triorgano(1,4-dicarboxy-2-butyl)silane.

The temperature at which the ozonolysis and oxidation steps of our process are conducted is not narrowly critical. We can employ temperatures ranging from about −30° C. to about 120° C. with good results. Although the temperatures below about −30° C. and above 120° C. may also be employed no commensurate advantage is obtained thereby according to our experience. In using temperatures much below −30° C. the solvent must be so chosen as to avoid freezing and crystallizing out of the starting material. Similarly, it will be obvious that the temperature should not be so high as to favor decomposition of the starting material or product. Our preferred temperatures lie in the range of from about 0° C. to about 80° C.

As solvents we can employ practically any of the so called liquid organic solvents in which our cyclohex-3-enyltriorganosilane starting material and the corresponding ozonide is soluble and which is non-reactive under the conditions of our process with the cyclohex-3-enyltriorganosilane starting material, the corresponding ozonide, ozone and hydrogen. Most desirable for use are the saturated aliphatic monocarboxylic acids such as acetic acid, propionic acid, caproic acid and the like. While the alkanols such as methanol, ethanol, propanol and the like do react with ozone, it has been our experience that they may be employed as solvents in the ozonolysis step of our process if the reaction be conducted at temperatures below about 50° C., as for example at temperatures of from about 0 to 20° C., as the rate at which they react with ozone thereat is extremely slow when compared to the rate at which our starting materials are ozonized. In those instances where an alkanol is employed as a solvent in the ozonolysis step of our process it will be desirable to change the solvent to a solvent which will not undergo oxidation during the subsequent step of our process.

We prefer to carry out the process of our invention under substantially anhydrous conditions. However, the presence of water is not objectionable except when the starting material contains alkoxy groups bonded to the silicon atom thereof. The presence of water is objectionable in the latter case because of the tendency of the alkoxy groups to hydrolyze when in admixture therewith.

The oxidizing compounds which can be employed to oxidize the ozonides of the cyclohex-3-enyltriorganosilanes includes any of the well known class of oxidizing compounds. We prefer to use such oxidizing compounds as peracetic acid, potassium permanganate, nitric acid, potassium dichromate and the like. While the oxidizing compound may be employed in the reaction in stoichiometric amounts, we prefer to employ such compounds in amounts which are in excess of the stoichiometric, as for example in amounts of from about 30 percent to about 60 percent in excess of the stoichiometric amount.

The cyclohex-3-enyltriorganosilane starting materials employed in our process can be represented graphically by the following formula:

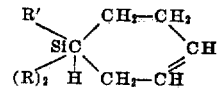

where R and R' represent organic groups taken from the group consisting of alkyl groups and alkoxy groups. Examples of the alkyl groups which R and R' may represent include methyl, ethyl, propyl and the like groups while examples of the alkoxy groups which R and R' may represent include methoxy, ethoxy, propoxy and the like groups. As is evident R and R' may represent different alkyl groups, different alkoxy groups or one may represent an alkyl group while the other an alkoxy group.

Our process is not applicable to the preparation of dicarboxylic acids from cyclohexenyltriorganosilanes other than those specified above. Without wishing to be bound by any particular theory, one possible explanation for the position of the olefinic linkage in the cyclohexenyl radical is that when the olefinic linkage is less than three carbon atoms removed from the silicon atom, the carbon to silicon bond of the products formed during subsequent reactions, such as hydrogenation, oxidation or hydrolysis, is extremely weak and cleavage thereof apparently takes place. By way of illustration, ozonolysis of vinyltrimethylsilane and allyltrimethylsilane, under conditions the same or similar to those used in the present invention, did apparently result in the formation of the corresponding ozonides; but upon subsequent hydrogenation and oxidation of the ozonides, it was not possible to obtain either the silicon-containing aldehydes or the silicon-containing acids.

Similarly, according to our experience, ozonolysis of 2-butenyltrimethylsilane and subsequent hydrogenation of the ozonide in solution will produce an aldehyde; (analysis of reaction solution indicated presence of aldehyde groups) however, the aldehyde could not be recovered from solution. Instead there was recovered a mixture which was predominately trimethylmethoxysilane with minor amounts of higher boiling silicon compounds. One of these compounds was identified as the dimethyl acetal of (trimethylsilyl) acetaldehyde.

The cyclohex-3-enyltriorganosilanes which we employ as starting materials are derivatives of cyclohex-3-enyltrichlorosilane which compound may be obtained by reacting butadiene with vinyltrichlorosilane at a temperature of about 180° C. The cyclohex-3-enyltrialkylsilanes are prepared by reacting cyclohex-3-enyltrichlorosilane with an alkyl Grignard reagent. For example, cyclohex-3-enyltripropylsilane can be prepared by reacting cyclohex-3-enyltrichlorosilane with sufficient quantities of propyl magnesium bromide as to result in the replacement of all the chlorine atoms with propyl groups. The cyclohex-3-enyltrialkoxysilanes are prepared by reacting cyclohex-3-enyltrichlorosilane with an alkanol. For example, cyclohex-3-enyltripropoxysilane can be prepared by reacting cyclohex-3-enyltrichlorosilane with sufficient amounts of propanol as to result in the replacement of all the chlorine atoms with propoxy groups. In addition, cyclohex-3-enylalkyldialkoxysilanes and cyclohex-3-enyldialkylalkoxysilanes may be prepared by a combination of the methods referred to above. For example, cyclohex-3-enylethyldiethoxysilane may be prepared by first reacting a cyclohex-3-enyltrichlorosilane with limited amounts of ethyl magnesium bromide as to replace only a single chlorine atom of each molecule with an ethyl radical and by subsequently reacting the resulting cyclohex-3-enylethyldichlorosilane with sufficient quantities of ethanol to replace the remaining chlorine atoms with ethoxy groups.

The triorgano(1,4-dicarboxy-2-butyl)silanes are prepared by dissolving a cyclohex-3-enyltriorganosilane such as cyclohex-3-enyltriethoxysilane in a suitable solvent such as glacial acetic acid and placing a flask thereof within a water bath cooled with ice. When the solution has reached the temperature of the bath which will be about 0° C., ozone, which may be produced in a silent electric discharge, is bubbled through the solution until no more is absorbed which indicates that ozonolysis is complete. The appearance of ozone in the off gas can be detected by a bubbler filled with a solution of potassium iodide and also by the fact that the reaction solution turns blue as a result of the presence of excess ozone. The solution of the ozonized cyclohex-3-enyltriethoxysilane can be then treated with peracetic acid. Preferably, the solution is placed in a flask and kept at a temperature of about 50° C. by a water bath and peracetic acid added thereto. The reaction mixture is permitted to stand for a period after which time the excess peracetic acid, if present, can be destroyed by heating the reaction mixture to its boiling point in the presence of platinized silica gel. The acetic acid solvent may then be removed from the reaction mixture by a vacuum distillation operation to obtain the triethoxy(1,4-dicarboxy-2-butyl)silane.

EXAMPLE

A solution comprising 15.4 grams of cyclohex-3-enyltrimethylsilane and 150 cc. of glacial acetic acid was prepared and placed in a flask positioned within a cold water bath. The solution was permitted to cool to the temperature of the bath (approximately 15° C.). Ozone, produced in the silent electric discharge, at a concentration of about 4 mole percent in oxygen, was then bubbled into the solution. The completion of the reaction was noted by both the appearance of ozone in the off gas, as detected by a bubbler filled with a solution of potassium iodide and by noting that the color of the solution became a light blue. The solution of the ozonized cyclohex-3-enyltrimethylsilane was then transferred to a flask kept at 50° C. by a water bath and 30 cc. of a 20 percent by weight solution of peracetic acid in acetic acid slowly added thereto. The solution was permitted to stand overnight after which time the excess peracetic acid was destroyed by refluxing the reaction mixture, for one hour, in the presence of platinized silica gel. The acetic acid was then stripped from the reaction mixture by a vacuum distillation operation and the residue obtained dissolved in sodium bicarbonate and filtered. Hydrochloric acid was then added and trimethyl(1,4-dicarboxy-2-butyl)-silane separated from the mixture as a crystalline material, after standing overnight. The yield of the crude trimethyl(1,4-dicarboxy-2-butyl)silane was 50% of theory based on the weight of the starting material. The crude trimethyl(1,4-dicarboxy-2-butyl)silane crystalline product was recrystallized from hot water and analyzed for carbon, hydrogen and silicon content. Its melting point was also determined. The data obtained appear in the table below:

*Table*

| | Analysis (Wt. Percent) | Theory (Wt. Percent) 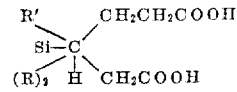 |
|---|---|---|
| C | 50.1 | 49.5 |
| H | 7.9 | 8.3 |
| Si | 12.5 | 12.9 |
| Melting Point, °C | 84–85 | 85–86.5 |

The compounds, namely the triorgano(1,4-dicarboxy-2-butyl)silanes prepared by the process of the instant invention are useful for intermediates in the preparation of useful organosilicon resins. They may be also esterified with organic polyols to form a new class of silicon-containing polyesters having utility as coatings and plasticizing resins of the alkyd type.

What is claimed is:

1. A process for preparing a triorgano(1,4-dicarboxy-2-butyl)silane represented by the graphic formula:

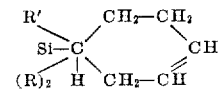

wherein R and R' represent organic groups taken from the class consisting of alkyl groups and alkoxy groups which comprises introducing ozone into a solution of a cyclohex-3-enyltriorganosilane represented by the graphic formula:

$$\begin{array}{c} R' \\ \diagdown \\ Si-C \\ \diagup | \diagdown \\ (R)_2 \ H \end{array} \begin{array}{c} CH_2-CH_2 \\ \diagdown \\ CH \\ \diagup \\ CH_2-CH \end{array}$$

wherein R and R' represent organic groups taken from the class consisting of alkyl groups and alkoxy groups, to form the ozonide of said cyclohex-3-enyltriorganosilane and adding an oxidizing compound to a solution of said ozonized cyclohex-3-enyltriorganosilane to form said triorgano(1,4-dicarboxy-2-butyl)silane.

2. A process for preparing a trialkyl(1,4-dicarboxy-2-butyl)silane which comprises introducing ozone into a solution of a cyclohex-3-enyltrialkylsilane at a temperature below about 120° C. to form the ozonide of said cyclohex-3-enyltrialkylsilane, adding peracetic acid to a solution of said ozonized cyclohex-3-enyltrialkylsilane at a temperature below about 120° C. to form a trialkyl(1,4-dicarboxy-2-butyl)silane.

3. A process for preparing a trialkoxy(1,4-dicarboxy-2-butyl)silane which comprises introducing ozone into a solution of the cyclohex-3-enyltrialkoxysilane at a temperature below about 120° C. to form the ozonide of said cyclohex-3-enyltrialkoxysilane, adding peracetic acid to a solution of said ozonized cyclohex-3-enyltrialkoxysilane at a temperature below about 120° C. to form a trialkoxy(1,4-dicarboxy-2-butyl)silane.

4. A process for preparing a trimethyl(1,4-dicarboxy-2-butyl)silane which comprises introducing ozone into a solution of the cyclohex-3-enyltrimethylsilane at a temperature below about 120° C. to form the ozonide of said cyclohex-3-enyltrimethylsilane, adding peracetic acid to a solution of said ozonized cyclohex-3-enyltrimethylsilane at a temperature below about 120° C. to form a trimethyl(1,4-dicarboxy-2-butyl)silane.

5. A process for preparing a trimethyl(1,4-dicarboxy-2-butyl)silane which comprises introducing ozone into an acetic acid solution of the cyclohex-3-enyltrimethylsilane at a temperature below about 80° C. to form the ozonide of said cyclohex-3-enyltrimethylsilane, adding peracetic acid to an acetic acid solution of said ozonized cyclohex-3-enyltrimethylsilane at a temperature below about 80° C. to form a trimethyl(1,4-dicarboxy-2-butyl)silane.

References Cited in the file of this patent

UNITED STATES PATENTS 2,628,245　　Speier ＿＿＿＿＿＿＿＿＿＿ Feb. 10, 1953

UNITED STATES PATENT OFFICE

Certificate of Correction

Patent No. 2,805,237 September 3, 1957

Alfred D. Kiffer et al.

It is hereby certified that error appears in the printed specification of the above numbered patent requiring correction and that the said Letters Patent should read as corrected below.

Column 1, lines 25 to 28, the formula should appear as shown below instead of as in the patent—

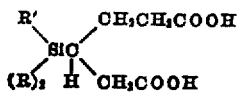

column 2, lines 47 to 50, the formula should appear as shown below instead of as in the patent—

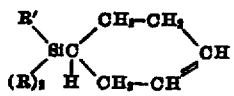

column 4, lines 49 to 52, the formula should appear as shown below instead of as in the patent—

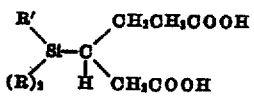

same column 4, lines 58 to 61, the formula should appear as shown below instead of as in the patent—

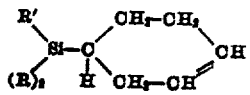

Signed and sealed this 4th day of February 1958.

[SEAL]

Attest:
KARL H. AXLINE,
Attesting Officer.

ROBERT C. WATSON,
Commissioner of Patents.